Dec. 25, 1962 O. F. BAUER ETAL 3,069,779
TESTER FOR GEARS AND THE LIKE
Filed June 17, 1958 5 Sheets-Sheet 1

INVENTORS
OLIVER F. BAUER
EARL ROY BEMAN
ROBERT E. SMITH
BY Richard W. Troverton
ATTORNEY

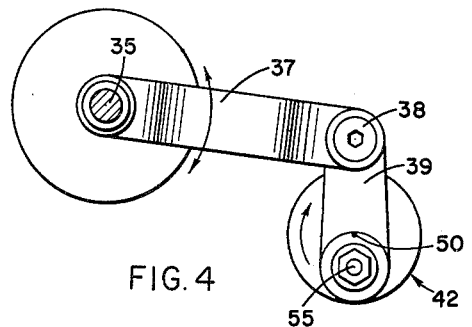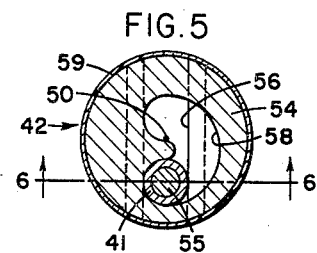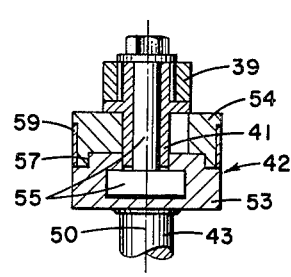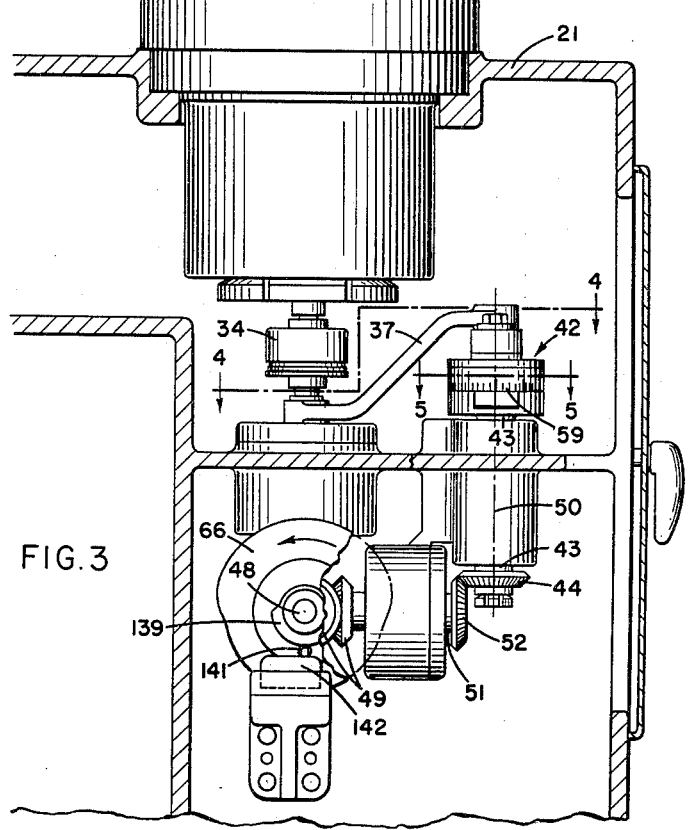

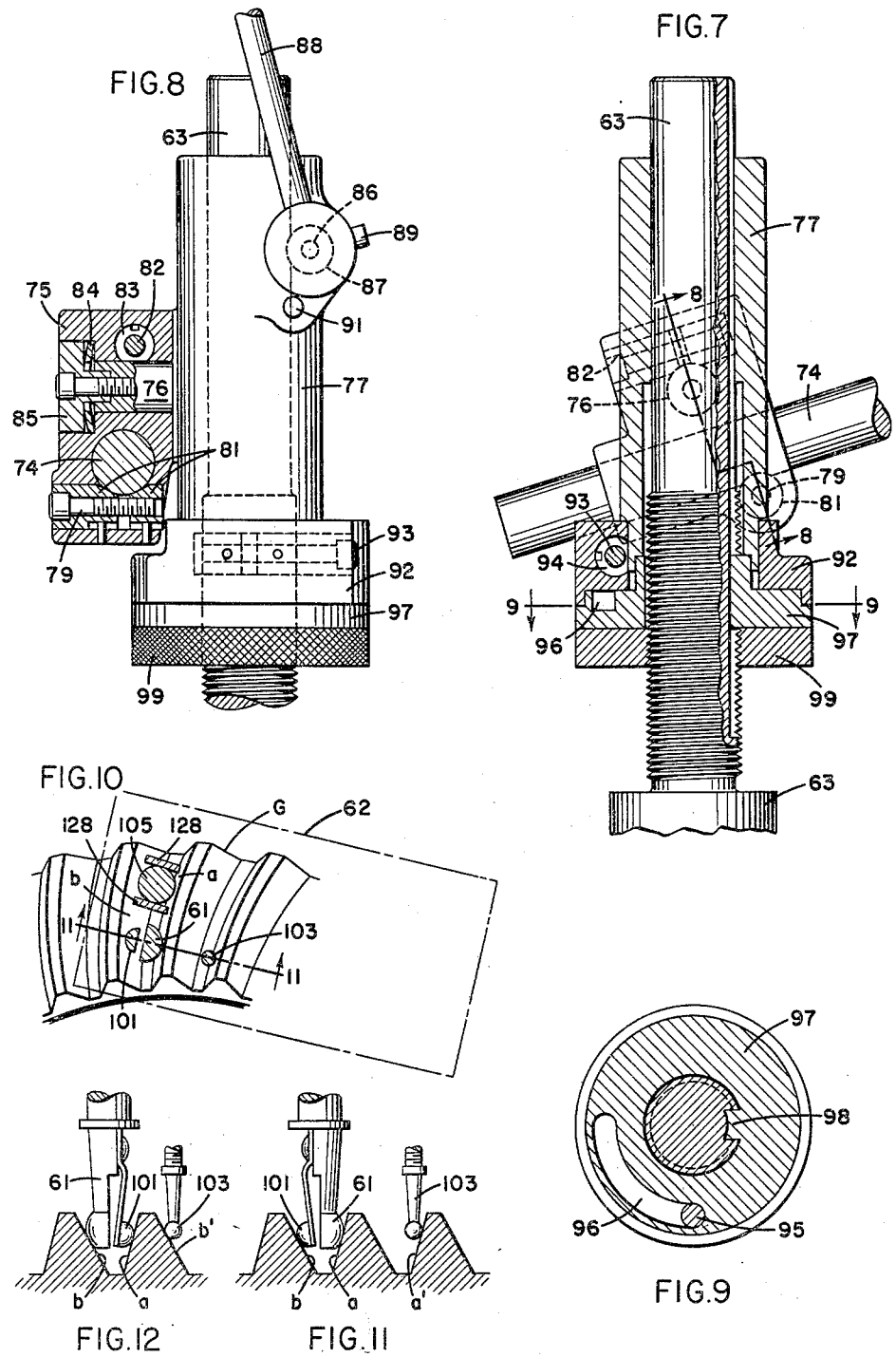

Dec. 25, 1962    O. F. BAUER ETAL    3,069,779
TESTER FOR GEARS AND THE LIKE
Filed June 17, 1958    5 Sheets-Sheet 4
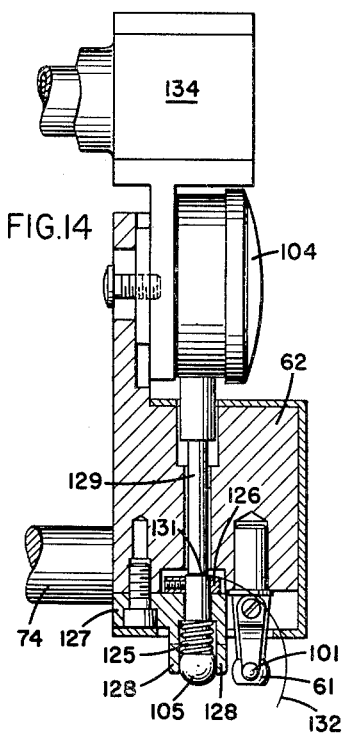
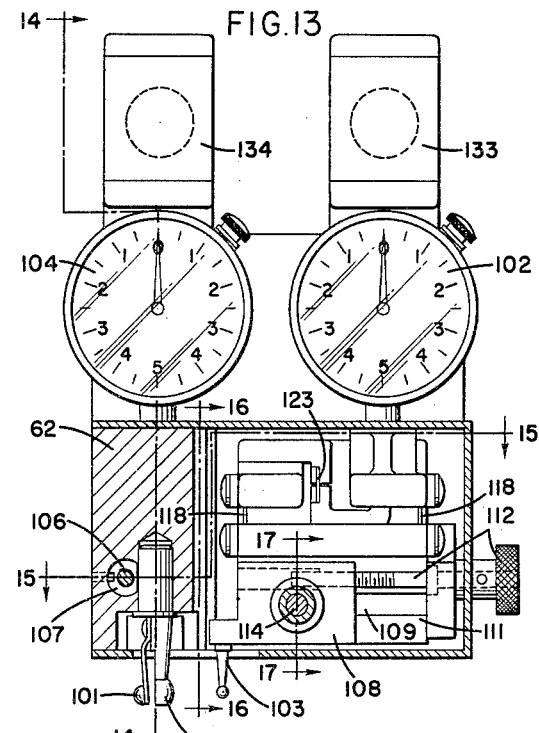
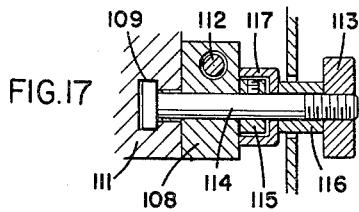
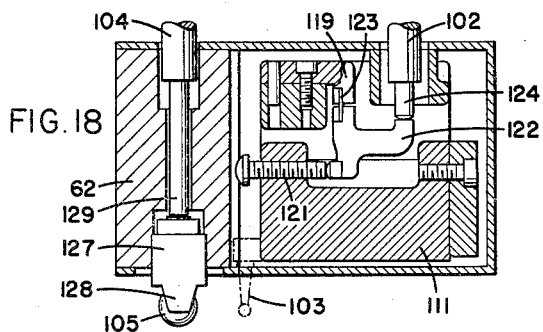
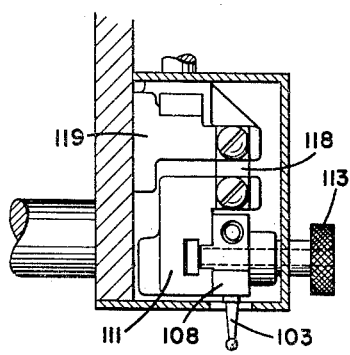
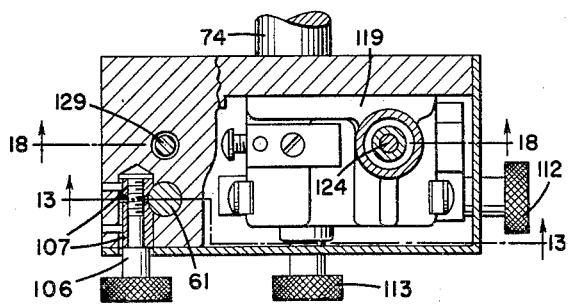

United States Patent Office

3,069,779
Patented Dec. 25, 1962

3,069,779
TESTER FOR GEARS AND THE LIKE
Oliver F. Bauer, Earl Roy Beman, and Robert E. Smith, Rochester, N.Y., assignors to The Gleason Works, Rochester, N.Y., a corporation of New York
Filed June 17, 1958, Ser. No. 742,537
17 Claims. (Cl. 33—179.5)

The present invention relates to a tester for bevel gears and similar toothed parts, and especially to a tester adapted for checking such parts for tooth spacing or runout, or both.

A primary object of the invention is a tester of this kind which will automatically index the part to successively check the several teeth thereof, yet will not depend for its accuracy upon the mechanism provided to index the spindle which supports the test part. Other objectives are a tester in which the same positioning finger and gaging probe may be employed for checking both sides of the teeth for tooth spacing; and a tester in which runout may be gaged accurately irrespective of tooth spacing error.

A tester according to the invention comprises a frame, a spindle for a test part rotatable on the frame, indexing means for periodically advancing the spindle angularly to thereby effect approximate tooth-to-tooth indexing of the test part and for then freeing the spindle for rotation, a positioning finger supported for movement relative to the frame into and out of engagement with a tooth space of the test part, the finger being adapted to complete the indexing of the test part by such engagement, and means connected to said indexing means and operating in time therewith for effecing such movement of the finger. Preferably the indexing means comprises a member oscillatable angularly on the frame, about an axis aligned with the spindle axis, by an adjustable-throw crank, whereby the amplitude of oscillation may be varied in accordance with the tooth number of the test part, and clutch means arranged to connect the spindle to said member for movement therewith during one swing of each oscillation and for disconnecting it for the return swing.

Preferably there is a contact resiliently carried by the finger and adapted to engage the opposite side of the tooth space occupied by the finger; and the latter is rotatably adjustable, on a gage block which supports it, so that it may engage either side of a tooth space and the resiliently supported contact the other side, thereby adapting the tester for gaging the tooth spacing of either or both sides of the teeth. For measuring runout or eccentricity the tester has a probe for actuating a gage device carried by the gage block, this probe having a spherical head adapted to contact simultaneously both sides of the tooth space occupied by the finger, there being surfaces on the block confining the spherical head against motion toward and away from the finger, lengthwise of said tooth space, while permitting it to move in a perpendicular direction, transverse of said tooth space, and the probe having a spherical surface concentric with the spherical head and engageable with a plane surface of the gage device for transmitting motion thereto in a direction substantially perpendicular to the plane surface and to both of the aforementioned directions.

The preferred embodiment of the invention is shown in the accompanying drawings, wherein:

FIG. 3 is a vertical part-sectional view in the planes designated 3—3 in FIG. 1;

Figure 19:
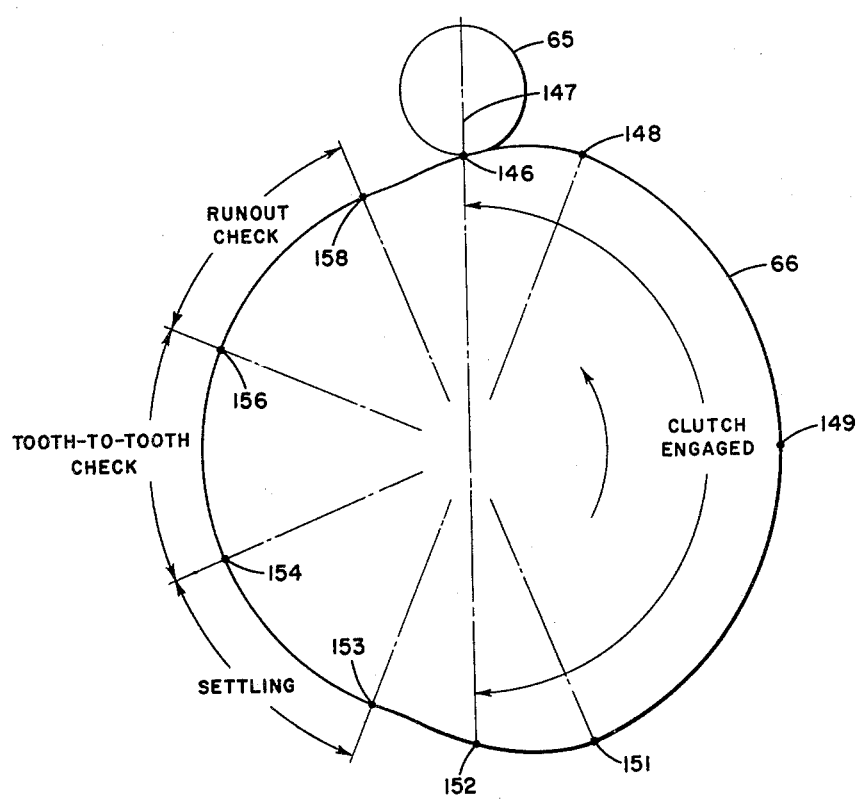
Figure 20:
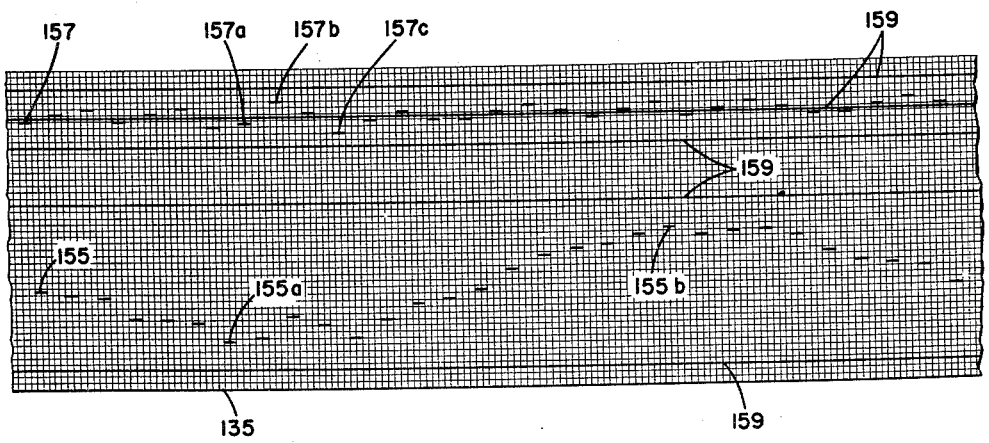

FIGS. 4 and 5 are detail horizontal sections respectively in planes 4—4 and 5—5 of FIG. 3;

FIG. 6 is a detail vertical section in plane 6—6 of FIG. 5;

FIG. 7 is a vertical section through the gage block support;

FIG. 8 is a view at right angles to FIG. 7, and partly in section in the planes designated 8—8 on that view;

FIG. 9 is a horizontal section in plane 9—9 of FIG. 7;

FIG. 10 is a diagrammatic plan view showing the relationship of the positioning finger and the probes to a test part;

FIG. 11 is a section in plane 11—11 of FIG. 10;

FIG. 12 is a similar view with the parts differently adjusted;

FIG. 13 is a vertical section through the gage block in planes 13—13 of FIG. 15, showing the gage means supported by the block;

FIGS. 14, 15, 16 and 17 are sections taken respectively in planes 14—14, 15—15, 16—16 and 17—17 of FIG. 13;

FIG. 18 is a horizontal section parallel to FIG. 13 in the plane designated 18—18 in FIG. 15;

FIG. 19 is a diagram showing the shape of the indexing cam and the operating cycle of the tester; and, FIG. 20 is a view showing a chart made by a recorder associated with the tester.

Referring first to FIGS. 1 to 6 of the drawings, the tester comprises a frame 21 in which a spindle 22 for the test part, in this instance a spiral bevel gear G, is rotatable about a vertical axis on ball bearings 23. The spindle carries a split expansible collet 24 that grips the bore of the gear and draws it against a seating ring 25 when a collet expander 26 is pressed downwardly against the resistance of a spring 27 by an eccentric 28. The latter is pivoted by a bolt 29 to a rod 31 anchored to the spindle and is actuated by a handle 32. The expander is slidable in the spindle on ball-sleeve bearing 33.

The spindle is connectible by an electro-magnetically operated clutch 34 to a member 35 which is mounted on anti-friction bearings 36 for oscillation in the frame about an axis aligned with the spindle axis. Member 35 has an arm 37 pivoted at 38 to a connecting rod 39 which journals the crank pin 41 of an adjustable-throw crank assembly 42. This assembly is carried by a shaft 43 which is journaled for rotation in the frame and has secured to its lower end a bevel gear 44 through which it is driven constantly, while the tester is in operation, by a drive comprising a motor 45, speed reduction gear unit 46, coupling 47, shaft 48 journaled in the frame, bevel gears 49, shaft 51 journaled in the frame, and bevel gear 52 which meshes with gear 44. The arrangement is such that for each rotation of crank assembly 42 the member 35, 37 makes one oscillation, and that during the forward swing of such oscillation, clockwise in FIG. 4, the clutch 34 is electrically energized and so connects the member to the spindle, while during the return swing the clutch is deenergized allowing the member 35, 37 to return free of the spindle. Thus for each rotation of the crank the spindle is advanced by an angle whose magnitude depends upon the throw of the crank assembly. This is adjustable so that the angle will closely approximate the angular pitch of the test part. Due to the harmonic nature of the motion of arm 37, the spindle is smoothly accelerated and decelerated to and from a stop, and it is while the spindle is stationary that the clutch is engaged and disengaged.

To enable adjustment of crank throw the crank pin 41, which is tubular, is secured to crank cheek 53 and an adjusting disc 54 by a T-bolt 55 whose head is anchored in a transverse T-slot 56 in the cheek. The disc is rotatable on center 57 of the cheek and has an eccentrically disposed semi-circular cam slot 58 through which the crank pin extends. After first loosening the nut on the T-bolt, the disc 54 may be turned to thereby cam the pin and T-bolt along the T-slot to the desired radial distance from the axis 50 of shaft 43. A scale 59 on the disc is calibrated in terms of tooth numbers, whereby this throw adjustment of the crank may readily be made to adapt the machine for a test part of any tooth number within its range.

After each approximate indexing or angular advance of the test part by the action of crank 42 and clutch 34, the part is accurately positioned, to complete the indexing operation, by the entry of a positioning finger 61 into one of the tooth spaces of the part. The finger is carried by a gage block 62 mounted adjustably on a support comprising a rod 63 which is guided by ball-sleeve bearings 64 for vertical motion in the frame. A follower roller 65 on the lower end of the rod rolls on a disc cam 66 keyed to shaft 48. The cam, which rotates in one-to-one ratio with the crank 42, raises the rod to thereby lift finger 61 from a tooth space of the test part just before each angular advance of the spindle by the crank and clutch 42, 34 is begun, and allows the rod to lower by gravity, to engage the finger in the next tooth space upon the conclusion of such advance. When rod 63 is in its lowermost position a flange 70 thereon, FIG. 1, seats on stationary shoulder 80 of the frame, and the follower 65 is out of contact with cam 66. For holding the rod against angular motion in bearings 64 it is provided with an outrigger 67 which carries rollers 68 and 69 that roll respectively on vertical tracks 71 and 72. Track 71 is rigid with frame 21 while track 72 is movable in a channel in the frame and is pressed against the roller 69 by a spring 73, FIG. 2. By this arrangement the outrigger always bears through roller 68 against fixed track 71.

The gage block 62 is universally adjustable on the rod 63, by the means shown in FIGS. 7 and 8, to accommodate test parts of different designs. The means shown also enable the block to be swung away from its operative position above the spindle, to provide clearance for mounting or removing a test part, without disturbing the adjustment. Rigid with the block is a supporting rod 74 extending slidably and rotatably through a swivel fitting 75 which in turn is rotatable upon a stud 76 formed on a tubular part 77 that is rotatable on the upper end of rod 63. Rod 74 is perpendicular to stud 76, and the latter is perpendicular to rod 63, thus providing for the universal angular adjustment of the block relative to rod 63, while by sliding the rod 74 lengthwise in fitting 75 and by vertical adjustment of tubular part 77 the block may be positioned at varying distances laterally and vertically with respect to rod 63. After being adjusted, the rod 74 is clamped to fitting 75 by tightening screw 79 which draws together clamp jaws 81 that are slidable in the fitting and are engageable with the rod. A similar screw 82 and clamp jaws 83 serve to clamp fitting 75 to stud 76. To yieldably support the swivel fitting against turning on the stud while the clamp jaws 83 are opened to enable adjustment of the gage block, a spring washer 84 is provided between a shoulder in the fitting and a retainer 85 secured to the stud.

Tubular part 77 is clamped to rod 63 by a screw 86 and clamp jaws 87 which are essentially like parts 79, 81, except that screw 86 has secured thereto an actuating lever 88. On the lever is a projection 89 for abutting a stop 91 on part 77 in the position of the lever in which the clamp jaws 87 are opened. In this position the lever is substantially horizontal and hence may be conveniently used to swing the gage block around the vertical rod 63 between an operative position above the spindle 22 and an idle position far enough to one side of the spindle as to be clear of a test piece that is being mounted or removed. In the position of the lever shown in FIG. 8 the clamp jaws are closed.

Tubular part 77 is angularly adjustable in a ring 92 which is clamped thereto by a screw 93 and clamp jaws 94 similar to the parts 79, 81 previously described. The ring has a pin 95 engaged in an arcuate groove 96 in a washer 97 which is held against rotation by having a key 98 engaged in a keyway in the upper portion of the rod 63. The washer rests on a knurled nut 99 which is screw threaded to rod 63 and thereby constitutes a support for the gage block assembly 77, 74, 62 when the clamp means 88, 86, 87 are released. By first releasing these clamp means and then turning the nut the assembly may be raised or lowered. Pin 95 and groove 96 limit swinging motion of the gage block, to and from its operative position, to ninety degrees.

Referring now to FIGS. 10 to 18, the gage block 62 carries, in addition to positioning finger 61, a resiliently supported contact 101 for engaging the opposite side of a tooth space of the test part from that engaged by the finger. It also carries a standard dial indicator 102 for tooth spacing error, an actuating probe 103 for the indicator, a standard dial indicator 104 for eccentricity or runout and an actuating probe 105 for the latter indicator. Finger 61 has a semi-spherical tip for engagement with a tooth side and a cylindrical shank that is rotatable in a bore in the block 62. It may therefore be turned so as to engage either the left side of a tooth, as in FIGS. 10 and 11, or the right side, as in FIG. 12. After such adjustment it is clamped by a screw 106 and clamp jaws 107, FIGS. 13 and 15, which are similar to parts 79, 81. The contact 101 is connected by a leaf spring to the finger 61 and hence in either position of adjustment engages the side of a tooth space opposite to that engaged by the finger. It thus acts to hold the finger in firm contact with the tooth side $a$ in FIG. 11 or with tooth side $b$ in FIG. 12.

Probe 103 is rigidly secured to a slide 108 that is adjustable along a T-slot guideway 109 in a block 111 by means of an adjusting screw 112. By this adjustment the probe is brought into contact with a tooth side corresponding to that engaged by the finger 61 but of the next adjacent tooth. That is, the probe is made to engage tooth surface $a'$ in FIG. 11 or tooth surface $b'$ in FIG. 12. After such adjustment the slide 108 is clamped to the block 111 by tightening nut 113 on a T-bolt 114 which is anchored in the slot and extends through the slide. A collar 115 secured to the T-bolt prevents canting of the slide during its adjustment, while the nut 113 is loosened. When tightened the nut exerts clamping pressure on the slide through sleeve 116 and through a cup shaped spacer 117 which surrounds but does not touch the collar. The block 111 is supported by parallel leaf springs 118 which are anchored to a member 119 rigid with the gage block 62. A screw 121 carried by block 111 abuts one arm of a bellcrank 122 that is fulcrumed on member 119 by means of a leaf spring 123, while the other arm of the bell crank abuts the contact point 124 of the indicator 102.

The several parts are so adjusted that when the rod 63 and the gage block are lowered to enter the finger 61 and the contact 101 in a tooth space of the test part, the probe 103 contacts tooth side $a'$ or $b'$ and is moved thereby either to the left or right, in FIGS. 11 and 18, as a unit with block 111 and screw 121, guided by leaf springs 118. The bell crank is accordingly swung about its fulcrum to effect vertical motion of the indicator contact point 124. The indicator may then be read to determine the magnitude of any error in tooth spacing between tooth sides $a$ and $a'$, or between tooth sides $b$ and $b'$.

Probe 105 has a spherical head adapted to contact simultaneously both sides of the tooth space occupied by finger 61 under pressure of a light coil spring 125 which surrounds the cylindrical shank of the probe and bears on a retainer 127 secured to the gage block 62. A collar 126 on the shank is engageable with the retainer to prevent the probe from dropping off when the gage block is raised. Parallel flanges 128 depending from the retainer confine the spherical head of the probe against motion in a direction lengthwise of the related teeth of the test part, i.e. in a direction toward or away from finger 61 (see FIG. 10), but permit the head freedom of motion in a perpendicular direction, i.e. transversely of the related teeth. The flanges also permit angular motion of the probe about the center of its spherical head, to the extent permitted by clearance which is provided between the retainer 127 of the stem of the probe. The flanges 128 of course also permit motion of the probe in the vertical direction in which the contact point 129 of indicator 104 is movable. In order that motion of the probe resulting from movement of its spherical head transversely of the tooth space will not affect the reading of indicator 104 the end surface 131 of the probe shank is made a spherical surface concentric with the spherical head as is indicated by arc 132, while the bottom face of the indicator contact point is made a plane surface perpendicular to the direction of plunger motion. The arrangement is such that the indicator shows differences in composite eccentricity or runout, made up of both radial runout and axial runout of the test part and regardless of tooth spacing error.

Figures 1, 2:
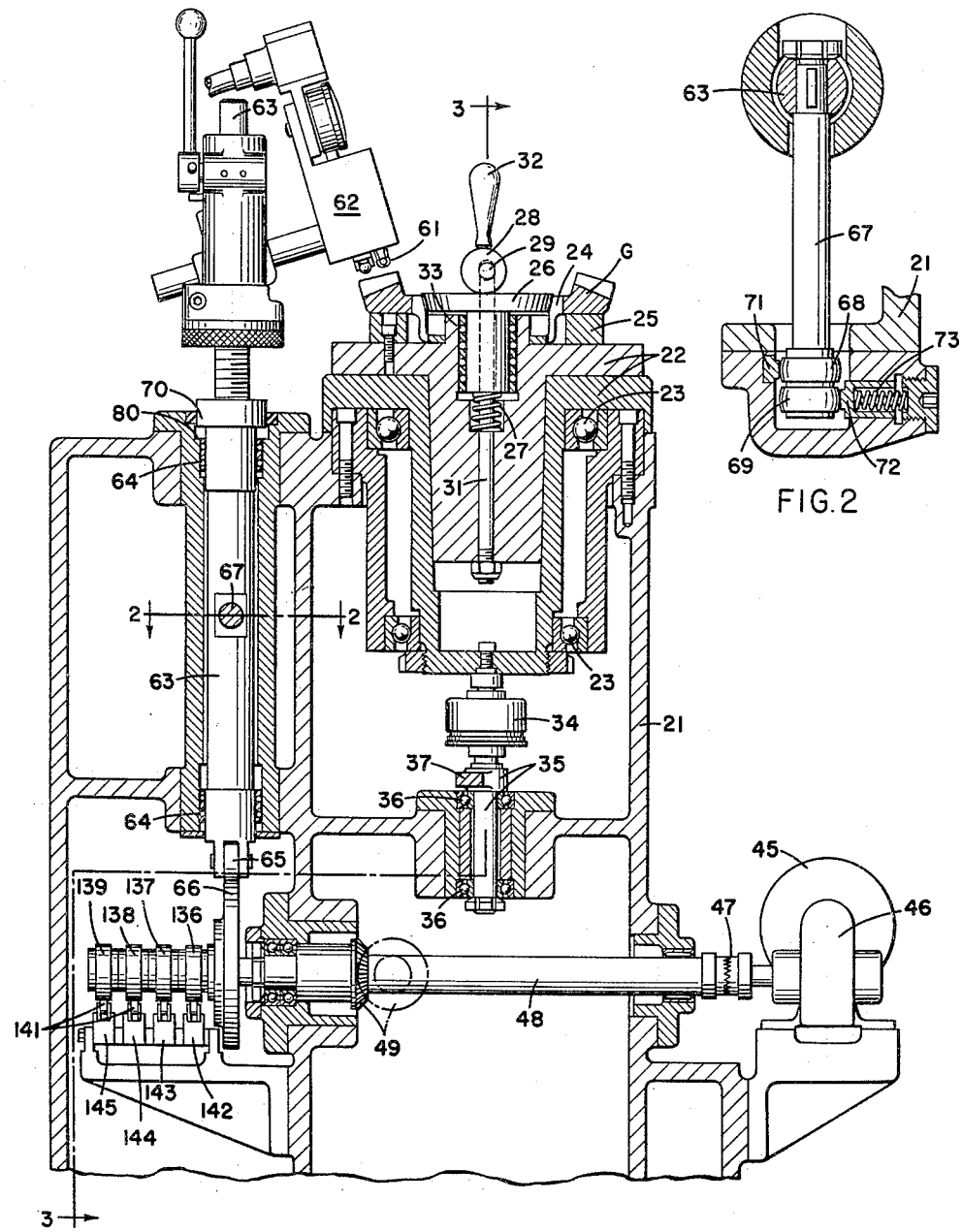
FIG. 1 is a vertical section through the tester in the plane of the spindle for the test part.
FIG. 2 is a detail horizontal section in plane 2—2 of FIG. 1.

For the purpose of recording the indicator readings the indicators 102 and 104 are provided with standard electrical pickup heads, 133 and 134 respectively, which are electrically connected in a well known manner to a recording instrument to actuate the pen thereof. The electrical connections of the two heads to the recorder are in parallel and each is connected and disconnected by a cam operated switch whereby a record such as that shown in FIG. 20 may be made by the pen on a suitable chart 135 that is advanced beneath the pen by the motor of the recorder. Referring to FIGS. 1 and 3, four switch-operating cams designated 136, 137, 138 and 139 are secured to shaft 48 and hence make one turn for each cycle comprising one gaging and one indexing operation. The cams are engaged by follower rollers 141 on the actuating arms of switches 142, 143, 144 and 145 respectively. Switch 142 is arranged to control the electro-magnetic clutch 34, switches 143 and 144 to respectively control the electrical connection of heads 134 and 133, FIG. 13, to the recorder, while switch 145 whenever closed energizes a counter for automatically stopping the motor 45 after the last tooth of the test part has been gaged. The counter, of well known construction and hence not shown, is of the kind which after a number of energizations resets itself and simultaneously stops the motor. It is adjustable so as to reset after any selected number of energizations and during the set-up of the machine is so adjusted in accordance with the tooth number of the test part.

The cams 136—139 are so proportioned and related to each other and to cam 66 that the following sequence of operation occurs when the tester is operating: On each revolution of the cam 66, counterclockwise in FIG. 19, when point 146 is on the centerline 147 as shown, the follower roller 65 and the gage block 62 are partially raised, so that finger 61 is out of contact with the test part. At this moment the switch 142 is closed by cam 136, causing engagement of clutch 34; and indexing crank 42 is in dead center position ready to begin the half-turn thereof during which it indexes the spindle 22. At point 148, i.e. at the time this point on the cam reaches centerline 147, the upward motion of the gage block is ended and indexing is in progress. At point 149 the counter switch 145 is momentarily closed by cam 139. At point 151 lowering of the gage block begins; and at point 152, while the gage block is partially lowered, the indexing half-turn of crank 42 is completed and cam 136 allows switch 142 to open, effecting disengagement of clutch 34. At point 153 lowering of the gage block is completed, so that the finger 61, resilient contact 101, and probes 103 and 105 are in contact with the test part, and a period of settling begins during which any tremors in the gage parts subside. At point 154 cam 138 closes switch 144, connecting the tooth spacing pick-up head 133 to the recorder. This starts operation of the chart motor and causes the recorder pen to ink a mark 157 on chart 135. By the position of this mark, vertically in FIG. 20, a record is made of the relative spacing of probe 103 from finger 61. At point 156 cam 138 allows switch 144 to open, disconnecting pick up 133, and cam 137 closes switch 143 connecting the runout pick up 134 to the recorder. Accordingly the chart motor continues to run but the recorder pen, now responding to the pick up 134, inks a mark 155 on the chart, the position of which mark is indicative of the vertical position of the probe 105 relative to the gage block 62. At point 158 cam 137 allows switch 143 to open, disconnecting the pick up 134 from the recorder and stopping the chart drive. The cycle of operation beginning with raising of the gage block then repeats.

After a number of such cycles of indexing and recording corresponding to the tooth number of the test part, the motor 45 is stopped by the counter with point 149 of the cam 66 at centerline 147, so that when the tester is run again it will start from this position.

The chart is calibrated to a suitable scale; for example in FIG. 20 each vertical division represents one ten-thousandth (0.0001) of an inch. According to the example shown, the greatest tooth-to-tooth error, shown by marks 157a and 157b is 0.00035 inch, and the total accumulated error, represented by the vertical difference between marks 157b and 157c is 0.0005 inch. The eccentricity of the test part, represented by the spacing of marks 155a and 155b is 0.0017 inch. For convenience in reading the chart, or to define acceptable tolerances, heavy lines such as those designated at 159 may be made on the chart either before or after the recording operation. As will be apparent, the recorder may, if desired, be disconnected or omitted and readings of tooth spacing and runout taken directly from the dial indicators 102, 104.

It will be understood that the foregoing disclosure of the preferred form of tester and its mode of operation has been made by way of illustration and example, and not by way of limitation, and that various changes may be made without departing from the spirit of the invention or from the scope of the appended claims.

What we claim is:

1. A tester for bevel gears and similar toothed parts comprising a frame, a spindle for a test part rotatable on the frame, indexing means for periodically advancing the spindle angularly to thereby effect approximate tooth-to-tooth indexing of the test part and for then freeing the spindle for rotation, a positioning finger supported for movement relative to the frame into and out of engagement with a tooth space of the test part, the finger being adapted to complete the indexing of the test part by such engagement, and means connected to said indexing means and operating in time therewith for effecting such movement of the finger.

2. A tester according to claim 1 in which said indexing means comprises a member supported by the frame for angular oscillation about an axis aligned with the spindle axis, drive means for effecting such oscillation, and clutch means arranged to connect the spindle to said member for movement therewith during one swing of each such oscillation and for disconnecting it for the return swing.

3. A tester according to claim 2 in which said clutch means comprises an electrically actuated clutch and a control switch therefor connected to said drive means for operation in time therewith.

4. A tester according to claim 2 in which said drive means comprises an adjustable-throw crank, whereby the amplitude of oscillation of said member may be varied in accordance with the tooth number of the test part.

5. A tester according to claim 1 in which the work spindle is vertical and there is a support for the positioning finger which is slidable vertically in the frame and is adapted to lower by gravity to engage the finger with the test part.

6. A tester according to claim 5 in which the support in its lowermost position rests on a seat on the frame and is out of contact with the means for effecting movement of the positioning finger.

7. A tester according to claim 5 in which the means for effecting movement of the positioning finger comprises a rotatable cam for raising and controlling the lowering of said support.

8. A tester according to claim 5 in which the positioning finger is carried by a block having limited angular motion on the support between a working position above the test part and an idle position clear of the test part, and there are releasable clamp means for securing the block to the support in said working position.

9. A tester according to claim 8 in which there are means to adjust said predetermined position of the block relative to the support, to accommodate test parts of different designs.

10. A tester according to claim 1 in which the positioning finger is rigidly secured to a gage block and is adapted to engage one side of a tooth space, there is a contact resiliently supported by the block for engaging the opposite side of the tooth space, and gage means carried by the block and including a probe engageable in an adjacent tooth space, there being means whereby said probe may be adjusted relative to the block to cause it to engage a tooth side of said adjacent tooth space corresponding to the tooth side engaged by said finger.

11. A tester according to claim 10 in which said contact is resiliently supported by the positioning finger and the latter is rotatably adjustable on the gage block to adapt it for engagement with either side of a tooth space and the resiliently supported contact with the opposite side.

12. A tester according to claim 10 in which there is a second gage means carried by the head, a spring-backed probe for actuating said second gage means and having a spherical head adapted to contact under spring pressure both sides of the same tooth space occupied by the positioning finger, there being means on the gage block confining the spherical head against motion toward and away from the finger, lengthwise of the adjacent teeth of the test part, while permitting it to move in a perpendicular direction, transverse of said teeth, and said spring-backed probe has a spherical surface concentric with said spherical head and engageable with a plane surface of said second gage means for transmitting motion thereto.

13. A tester according to claim 1 in which the positioning finger is rigidly secured to a gage block and is adapted to engage one side of a tooth space, there is a contact resiliently supported by the block for engaging the opposite side of the tooth space, a gage device carried by the head, a probe for actuating said gage device and having a spherical head adapted to contact simultaneously both sides of the tooth space occupied by the finger, there being surfaces on the block confining the spherical head against motion toward and away from the finger, lengthwise of said tooth space, while permitting it to move in a perpendicular direction, transverse of said tooth space, and said probe having a spherical surface concentric with said spherical head and the gage device having a plane surface with which said spherical surface is engageable for transmitting motion to the gage device in a direction substantially perpendicular to said plane surface and to both of the aforementioned directions.

14. A tester for bevel gears and similar toothed parts comprising a frame, a spindle for the test part rotatable on the frame, a gage block having a positioning finger adapted for movement as a unit therewith relative to the frame to bring the finger into and out of positioning engagement with a tooth side of the test part, a gage device carried by the block, a probe for actuating said device and having a spherical head adapted to contact simultaneously both sides of the tooth space occupied by said finger, the block having surfaces confining the spherical head against motion toward and away from the finger, lengthwise of said tooth space, while permitting it to move in a perpendicular direction, transverse of said tooth space, and said probe having a spherical surface concentric with said spherical head and the gage device having a plane surface with which said spherical surface is engageable for transmitting motion to the gage device in a direction substantially perpendicular to said plane surface and to both of the aforementioned directions.

15. A tester for bevel gears and similar toothed parts comprising a frame, a spindle for the test part rotatable on the frame, a gage block having a positioning finger adapted for movement as a unit therewith in a predetermined path relative to the frame to bring the finger into and out of engagement with the tooth surface at one side of a tooth space of the part, a contact resiliently carried by the finger to engage the tooth surface at the opposite side of the tooth space, said finger being rotatably adjustable in the gage block about an axis approximately perpendicular to the bottom of the tooth space to thereby enable the finger to engage the tooth surface at either side of the space and the contact to engage the tooth surface at the opposite side, a gage device carried by the block and including a probe engageable in an adjacent tooth space, said device being arranged to show variations in the distance between the finger and the probe, and means whereby the probe may be adjusted relative to the block to cause it to engage whichever tooth side of said adjacent tooth space corresponds to the side engaged by said finger.

16. A tester for gears and other toothed parts having a frame, a spindle for a test part rotatable on the frame; intermittent indexing means for the spindle comprising a motor-driven adjustable-throw crank, a member oscillated by said crank, and a clutch for connecting the member to the spindle and adapted to clutch and de-clutch respectively when the member is in opposite terminal positions of its oscillation; and a positioning finger supported for movement relative to the frame into and out of engagement with a tooth space of the test part, the finger being adapted to complete the indexing of the test part by such engagement, and means so connected with said crank as to operate in time therewith with said crank for effecting such movement of the finger when the spindle is de-clutched from said member.

17. A tester for gears and similar toothed parts, comprising a frame, means for rotatably supporting a test part on the frame, a gage block having a positioning finger adapted for movement as a unit therewith to bring the finger into and from a tooth space of the part while moving respectively into and from a predetermined position relative to the frame, an element resiliently carried by the finger and adapted to contact one side of said space to thereby apply a torque to the test part to hold the opposite side of said space against the finger when the latter is in said predetermined position, said finger being rotatably adjustable in said block about an axis approximately perpendicular to the bottom surface of the tooth space for reversing its position and that of said element relative to said tooth space of said test part, and a gage device carried by said block and including a probe adapted for contact with a side of another tooth space of the part when said finger is in said predetermined position.

References Cited in the file of this patent

UNITED STATES PATENTS

| | | |
|---|---|---|
| 1,419,306 | Reisner | June 13, 1922 |
| 1,494,648 | Tillyer | May 20, 1924 |
| 1,651,159 | Schurr | Nov. 29, 1927 |
| 1,695,453 | Carpenter | Dec. 18, 1928 |
| 2,058,579 | Erickson | Oct. 27, 1936 |

| | | | | | |
|---|---|---|---|---|---|
| 2,060,518 | Miller | Nov. 10, 1936 | 2,846,773 | Carlson | Aug. 12, 1958 |
| 2,509,185 | Eckel | May 23, 1950 | 2,906,030 | Hofler | Sept. 29, 1959 |
| 2,633,777 | Hoern | Apr. 7, 1953 | | FOREIGN PATENTS | |
| 2,635,347 | Gelfand | Apr. 21, 1953 | | | |
| 2,807,175 | Tandler | Sept. 25, 1957 | 867,917 | Germany | Mar. 5, 1953 |